(No Model.) 2 Sheets—Sheet 2.
C. A. MAHLE.
MACHINE FOR CUTTING TOP KNOTS FOR BLACKING BRUSHES.
No. 309,068. Patented Dec. 9, 1884.
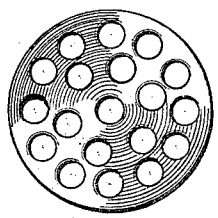
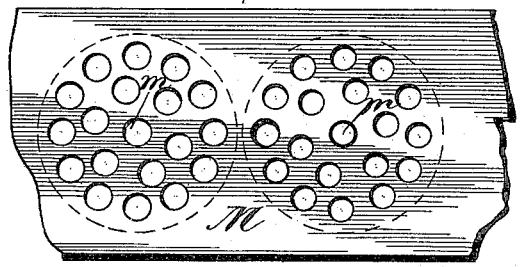
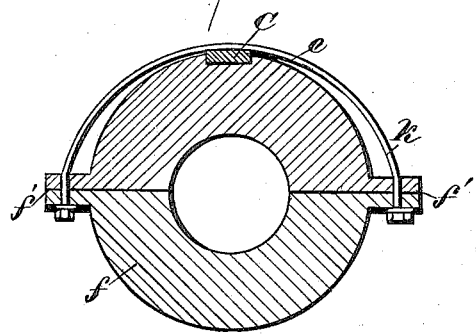
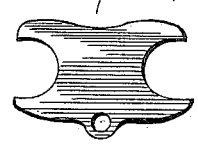
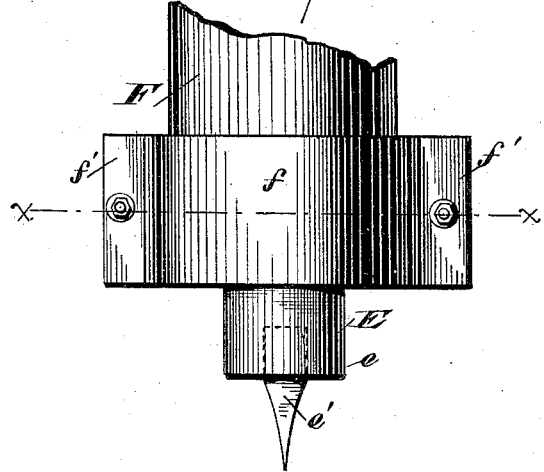
WITNESSES
Wm M. Monroe.
Geo. W. King
INVENTOR
Clemence A. Mahle
by
Leggett & Leggett.
Attorneys United States Patent Office.

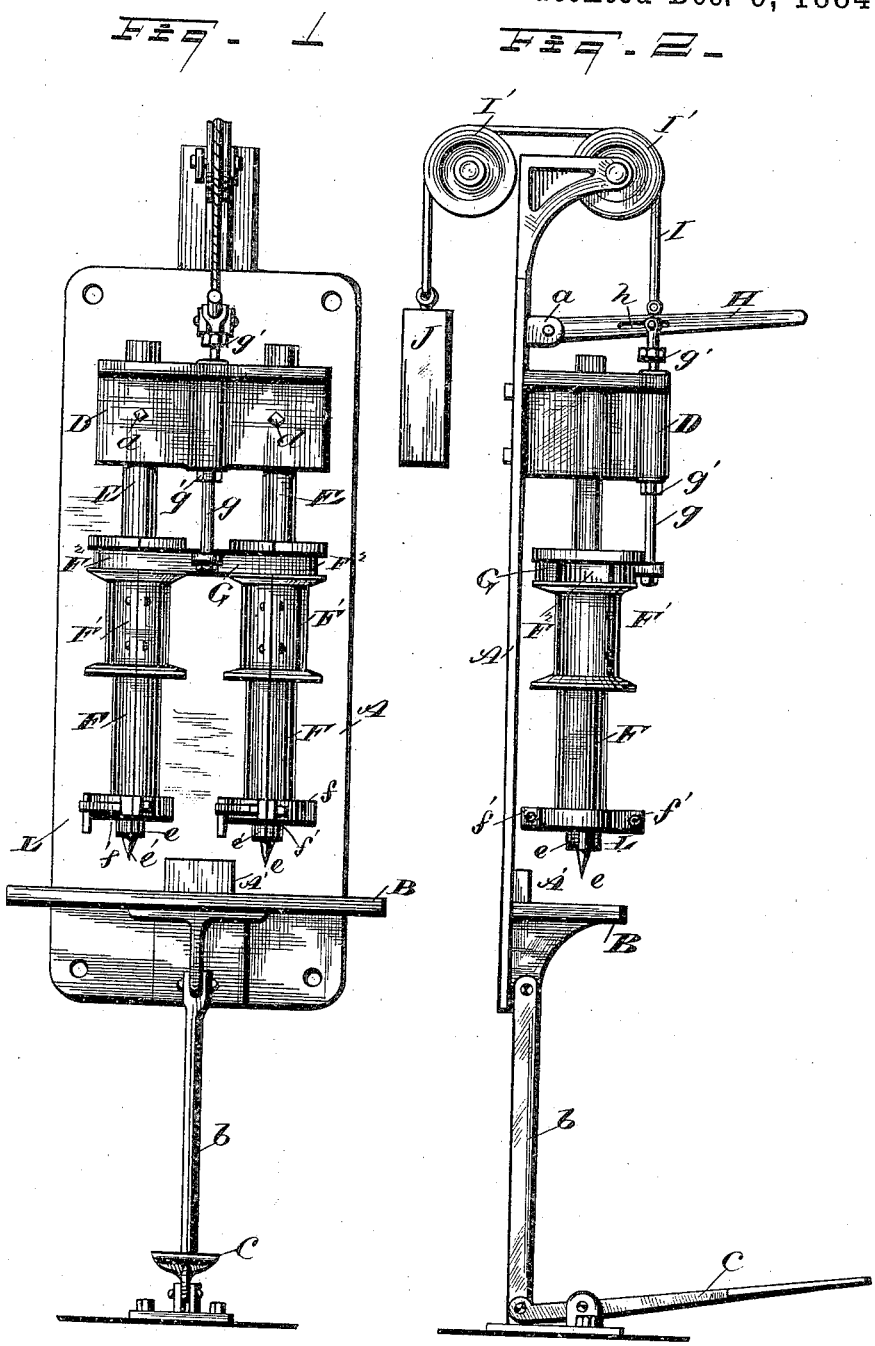

CLEMENCE A. MAHLE, OF CORRY, PENNSYLVANIA.

MACHINE FOR CUTTING TOP-KNOTS FOR BLACKING-BRUSHES.

SPECIFICATION forming part of Letters Patent No. 309,068, dated December 9, 1884.

Application filed May 20, 1884. (No model.)

*To all whom it may concern:*

Be it known that I, CLEMENCE A. MAHLE, of Corry, in the county of Erie and State of Pennsylvania, have invented certain new and useful Improvements in Machines for Cutting Top-Knots for Blacking-Brushes; and I do hereby declare the following to be a full, clear, and exact description of the invention, such as will enable others skilled in the art to which it pertains to make and use the same.

My invention relates to a machine for cutting "top-knots," so called, for blacking-brushes, the object being to provide a machine that will cut two circular top-knots at one operation, and provided with stops and so adjusted that the top-knots, when cut in circular form by the machine, will remain attached to the block until severed by a subsequent operation.

With this object in view my invention consists in certain features of construction and in combination of parts hereinafter described, and pointed out in the claims.

As is well known to the trade, these top-knots are small perforated disks, that are to be provided with bristles and secured to the back of blacking-brushes. These disks I make from long pieces of wood that are of sufficient thickness for the two sets of disks or top-knots. I first bore the necessary holes in groups and to the required depth on one side of the block, then turn the block the other side up and repeat the operation, no effort being made to have holes from the opposite sides match. I bore the holes for two top-knots or a pair simultaneously, and the center holes of the respective groups thus bored in pairs are always the same distance apart. I next place the blocks thus prepared in the machine hereinafter described, and cut simultaneously a circular groove around each of the two groups of holes that are bored together. The grooves are cut to the required depth, but leave the circular disks thus formed attached at the bottom to the block. After a groove is cut around each group of holes that have been made on the respective sides of the block, the latter is set edgewise on a saw-table and severed through the center. The saw cuts across the bottom of the holes and circular grooves that have been made for the respective sides of the blocks, and leaves the disks or top-knots free from fins or broken wood, as they would have if the said holes and grooves had been cut through the block.

In the accompanying drawings, Figure 1 is a front elevation of my improved top-knot-cutting machine. Fig. 2 is a side elevation of the same. Fig. 3 is a plan view of a top-knot complete, ready for the bristles. Fig. 4 is a plan view of a portion of a block from which the top-knots are cut, with two groups of holes bored. Fig. 5 is an enlarged horizontal section through the cutter-head, taken on the line of $x\ x$, Fig. 6. Fig. 6 is an enlarged elevation of the cutter-head and attachments. Fig. 7 is a plan view of a forked plate or clutch that supports and operates the sleeve vertically.

A represents a broad vertical plate, that may be attached to a post or any convenient support. The part A is provided with a broad plate, A', with beveled or undercut edges that serve as a guide for the vertically-moving table B. This table is connected by the rod $b$ to the treadle C, by which the table is actuated.

D is a metal block secured to the part A or integral therewith, and provided with two vertical holes in which are secured, respectively, the pendent rods or axles E. These rods are fastened by the set-screws $d$, by loosening which the rods E may be adjusted vertically. The lower end of the rods E are shouldered at $e$, and terminate in the small conical ends $e'$, that fit, respectively, in the holes $m$ of the block M, (see Fig. 4,) the distance between the centers of the rods E being the same as the distance between the centers of the two groups of holes that are bored at one operation. If preferred, the part $e'$ may be a separate piece set in a hole in the end of the rod E, as shown in dotted lines in Fig. 6.

Upon the rods E are journaled, respectively, the sleeves F, one portion of which, F', is enlarged and forms a pulley for a belt, and with flanges at each end of the pulley, as shown. At $F^2$ is a deep annular groove in which operate, respectively, the forked ends of the plate G, that support and actuate the sleeve vertically.

To the plate G is attached the rod $g$, that slides vertically through a hole in the block D, and is forked at the upper end, and embraces the lever H, and is attached thereto by a pin passing through the slot $h$. The rear end of the lever is fulcrumed to the lugs $a$, projecting from the plate A'.

To the lever H is attached the cord I, leading over the pulleys I', and supporting the balance-weight J. The rod $g$ is provided with the jam-nuts $g'$, that are set to limit the movement of the rod, as required. The lower end of the sleeve is enlarged, forming the cutter-head $f$, that is provided with the flanges $f'$. The sleeve is made in halves, the lines of union being longitudinal and radial, and the two halves are fastened together by "blind-screws" in the part F' and by the band K, that is provided with bolt ends that pass through the flanges $f'$, as shown in Fig. 5. This band also secures the cutter L in the vertical recess $l$ on the edge of the cutter-head $f$. The edges where the two halves of the sleeve join may at any time be dressed off as the bore of the sleeve and the rods E wear, by means of which a nice fit may always be had between the rod and sleeve, or these edges may be cut away slightly and blocked apart with paper or thin strips of metal.

The operation of the device is as follows: A block, M, previously prepared by boring the holes, as aforesaid, is placed on the table B, which is then raised by the foot of the operator, applied to the treadle C, and the block M, in the meantime, is guided so that the two points $e'$ enter the respective central holes, $m$, and the block is pressed against the shoulders $e$ of the rods E. Next, by depressing the free end of the lever H, and by means of the connections already described, the sleeve F, which is rapidly revolving, is lowered so that the cutter L engages the block and cuts a circular groove to the required depth, that is gaged, as aforesaid, by the nuts $g'$ coming in contact with the block D. The lever H and the treadle C are next released, when, by the gravity of the weight J and of the table B, the parts return again to the position shown in Figs. 1 and 2. This operation is repeated until the necessary grooves are all cut on one side of the block. The block is then turned the other side up and the grooves cut in the same manner, after which the block, as aforesaid, is severed edgewise through the center, which latter operation severs the disks or top-knots from the block and leaves them as shown in Fig. 3.

What I claim is—

In a machine for cutting top-knots for blacking-brushes, the combination, with the depending rods E, secured in rigid frame, a vertically-movable table located under said rods, and a lever for moving the table, of the vertically-adjusting sleeves provided at their lower ends with cutter-heads and cutters, driving-pulleys secured to the sleeve, and the devices, substantially as described, for simultaneously elevating and lowering the sleeves, substantially as set forth.

In testimony whereof I sign this specification, in the presence of two witnesses, this 9th day of May, 1884.

CLEMENCE A. MAHLE.

Witnesses:
W. ED. MARSH,
S. B. SHILEY.